Dec. 16, 1969          E. PURCELL          3,484,646
ELECTRIC WELDING GUN

Filed Sept. 3, 1968          2 Sheets-Sheet 1

INVENTOR
ERNEST PURCELL

BY G. Donald Welsh Jr.
ATTORNEY

Dec. 16, 1969  E. PURCELL  3,484,646
ELECTRIC WELDING GUN

Filed Sept. 3, 1968  2 Sheets-Sheet 2

INVENTOR
ERNEST PURCELL

BY J. Donald Weiser Jr.
ATTORNEY

United States Patent Office 3,484,646
Patented Dec. 16, 1969

3,484,646
ELECTRIC WELDING GUN
Ernest Purcell, 1108 York Ave., Lansdale, Pa. 19446
Filed Sept. 3, 1968, Ser. No. 756,745
Int. Cl. H05b 3/40
U.S. Cl. 314—5    6 Claims

ABSTRACT OF THE DISCLOSURE

An electric welding gun wherein a plurality of welding rods, stored in a magazine in the gun, are individually conveyed to the nozzle of the gun. The nozzle contains at least one magnet unit to retain the electrode stubs in the nozzle of the gun after the electrode has been driven therein.

---

This invention relates to an electric welding gun having an electrode driving means for driving individual electrodes in such a manner that the electrodes are substantially entirely consumed thereby eliminating waste and, yet, the gun is truly portable inasmuch as a cumbersome, heavy electrode reel is eliminated.

In electric arc welding, there are basically two types of electric welding guns which are used at present. These guns relate to two different techniques of electric arc welding. In one type of apparatus, as exemplified by U.S. Patent No. 2,806,126, a clamp like arrangement is utilized and an electrode is clamped therein. The electrode is consumed during the operation of welding. However, due to practical limitations as much as forty percent of the electrode is wasted. Part of this waste is produced because a portion of the electrode is utilized as a "stub" whereby good electrical contact is achieved between the welding gun and the electrode. This process is relatively slow inasmuch as the operator must continuously replace the electrodes in the welding gun. In addition, the process is relatively expensive inasmuch as a large percentage of waste is incurred. These factors tend to make this process relatively expensive on the basis of "cost per pound of welding material utilized."

Another method of welding is the so-called automatic process wherein a reel of electrode material is provided and a extremely long filament is fed through the gun. This process is exemplified by U.S. Patent No. 3,038,990. The automatic process may be an improvement over the first mentioned process in that less operating time is used by the operator in changing electrodes and a greater percentage of the electrode is deposited in an actual welding process. However, this process is extremely expensive especially in initial cost of the equipment required and, as well, the electrode cost is almost double the cost of the electrode material used in the first mentioned or manual process. It can be shown that on the basis of cost per pound of deposited material, the cost of the automatic process is substantially similar to the cost in the manual process.

The instant invention provides an electric welding gun which combines the best features of each of the foregoing processes and improves upon each of them whereby a faster, less expensive process is achieved. The initial cost of this equipment is substantially less than the automatic equipment. The cost of the electrodes is substantially less than the automatic method and in the neighborhood of the cost, per pound, of electrodes used in the manual process. However, this gun utilizes an automatic feed process wherein a plurality of individual electrodes is supplied to a feed hopper or the like and, through a selectively controlled drive means, the electrodes are individually and automatically placed in operating positions. Because of the structure of the welding gun of the instant invention, substantially all of the electrode is utilized inasmuch as no contact stub is required. While it is possible that some waste will occur, in many embodiments and usages waste will be substantially eliminated because of the interaction between individual electrodes in the gun.

The electric welding gun of this invention may be electrically driven, by means of a variable speed motor or the like. In the alternative, this gun may be driven mechanically, as for example by a coil spring or the like. Pneumatic operation is also contemplated.

Thus, it is one object of this invention to provide an electric welding gun.

It is another object of this invention to provide an electric welding gun which improves the efficiency of the welding electrode usage.

Another object of this invention is to provide a welding gun which is relatively portable and can be handled easily by an operator.

Another object of this invention is to provide an electric welding gun which permits fast, efficient, electric welding.

Another object of this invention is to provide an electric welding gun which is relatively simple and inexpensive to manufacture and use.

Another object of this invention is to provide an electric welding gun which can be used with the variable voltage welding machines with either A.C. or D.C. sources.

These and other objects and advantages of this invention will become more readily apparent when the following description is read in conjunction with the attached, drawings, in which.

Figure 1:
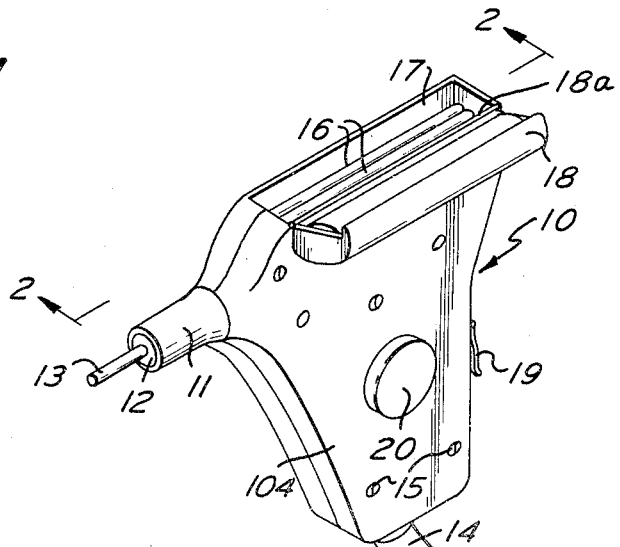
FIGURE 1 is a perspective view of the electric welding gun.

Referring now to FIGURE 1, there is shown a perspective view of the electric welding gun 10 of the subject invention. The perspective view is illustrative only and is not meant to be limitative of the actual configuration and construction of the electric welding gun. In fact, the construction of the gun, except as described herein, may be typical of construction known in the art. The welding gun includes handle 10A which may be shaped like a pistol grip and is suitable for the operator to hold in his hand during the welding operation. The gun may be fabricated in opposing halves which are held together by suitable mounting screws 15 or the like. An elongated nozzle 11 is disposed at one end of gun 10 and is utilized to effectively guide the welding electrode 13 toward the working surface (not shown). A separate guide tube or the like may be included within nozle 11. Tip 12 of nozzle 11 includes a suitable aperture therein which is defined, in size, to accommodate the size of electrode which is being utilized and assist in guiding the electrode. Tip 12 may be removable, as for example by being threadedly attached to nozzle 11 so that different size electrodes may be readily usable with the welding gun. In addition, tip 12 may provide an insulator at the end of the welding tip 35.

A suitable hopper 17 is located at the top portion of welding gun 10 and has a suitable tapered construction so that electrodes 16 which are stored therein will be controllably positioned toward suitable point at the bottom of the hopper as will appear hereinafter. A cover 18 which may include a spring loaded element is attached to the gun by means of hinge 18A. Thus, when cover 18 is placed over hopper 17 and latched in place, a spring (not shown) will force electrodes 16 down into the hopper 17 and ultimately into operating position as will appear hereinafter. The driving unit 20 which may be variable speed motor, a mechanical drive or the like, is substantially centrally located in the grip 10A. Switch 19 is provided at the handle 10A of welding gun 10 in order to control the operation of driving means 20. Switch 19 may be disposed at the front or rear of the handle in order to be either finger or thumb operated. The welding current is supplied to gun 10 in a standard manner from a suitable source (not shown) via cable 14.

Figure 2:
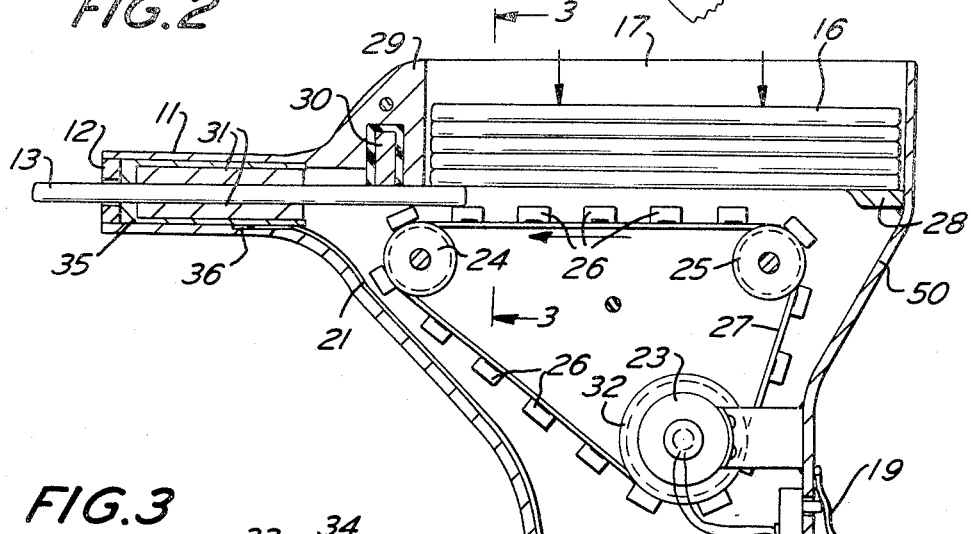
FIGURE 2 is a cross-sectional view of an electric welding gun with a motor drive taken along lines 2—2 of FIGURE 1.

Referring now to FIGURE 2, there is shown a cross-sectional view of the electric welding gun shown in FIGURE 1. The view is taken along lines 2—2 of FIGURE 1. The handle 10A in the electric welding gun is held together by screws 15. As is seen, the handle portion 10A is substantially hollow and includes a properly formed rearward member 50 which forms the back of the handle as well as the back of the hopper 17. A shelf or shoulder member 28 is affixed to the rearward member 50. The welding electrodes 16 disposed in hopper 17 rest on the shoulder 28 when in the bottommost position. The shelf or shoulder 28 is positioned to be slightly more than an electrode diameter above the driving element 26 described hereinafter. Thus, the electrodes, as they move through hopper 17 tends to be canted slightly towards the forward end of the gun even when that electrode, for example electrode 13, which is being consumed in the welding process has not been fully removed from the bottom position in hopper 17.

Cable 14 through which the welding current and other control signals are supplied is connected to the copper strip 21 which is, of course, insulated from the electric welding gun, per se, and mounted along the front wall portion thereof. Copper strip 21 is connected to welding tip 35 via suitable connector means 36. Typically, a lug screw may be utilized to effect this connection. The nozzle 11 is insulated from the welding tip 35 in order to provide safety for the operator. Of course, welding tip 35 is substantially an electrical contact with the electrode 13 which is being consumed in the operation. As is well known, when electrode 13 is brought into proper position relative to the work piece, the electric arc circuit is completed and the welding process effected.

A magnet 31 may be insulatedly mounted in the nozzle 11 in juxtaposition to the welding tip 35. Typically, magnets 31 are inserted in slots in nozzle 11 adjacent the electrode path. Magnets 31 may be a cylindrical magnet surrounding the electrode path and internally mounted relative to welding tip 35. Of course, magnet 31 may be disposed radially outwardly of welding tip 35 if so desired.

An additional magnet 30 is insulatedly mounted in mounting portion 29 which is part of the electric welding gun configuration. The function of magnets 30 and 31 is to magnetically retain the short stub of electrode 13 after it has left the control of the driving system such that the stub does not fall out of the gun during the welding operation. This arrangement provides better control of the electrodes and, therefore, greater efficiency in the usage thereof.

The driving mechanism in the motor driven unit shown in the embodiment of FIGURE 2 includes switch 19 which controls the operation of the variable speed motor 23. Suitable connections are effected between cable 14 and motor 23 via the control element 22 which is actuated selectively by switch 19. Motor 23 is connected to a suitable spool or drum 32. This drum is used to drive an endless web 27 of suitable material around the idler pulleys 24 and 25. The web rotates around this course in a counterclockwise direction. A plurality of magnetic elements 26 are affixed to the belt 27 in a suitable fashion. The number of magnetic elements 26 can be varied as required. However, a sufficient number of elements are required to effect a satisfactory magnetic interaction between the electrodes 16 and the elements 26 such that the electrodes 16 can be driven forwardly through the welding gun nozzle 11 when motor 23 and spool 32 drive web 27. However, the magnetic elements must be sufficiently dispersed as to provide an articulate web which will traverse the contours of the web path as suggested. Of course, the number of magnetic elements 26, the size thereof and the diameter of the idler wheels 24 and 25 along with driving drum 32 are interrelated and can be varied to effect suitable interaction thereof.

In operation, cable 14 is attached to a suitable source (not shown), a work piece (not shown) is attached to the source in a typical manner to provide a closed circuit when the electrode 13 is properly positioned adjacent thereto. Initially, no electrode extends through nozzle 11 or welding tip 35 of the electric welding gun. All of the electrodes are disposed in hopper 17 as suggested by electrodes 16. The bottom electrode has the rearward end thereof resting upon shelf 28 and the forward end thereof resting upon the drive system as for example on magnetic element 26.

Activation of switch 19 causes motor 23 to be energized and to turn in a counterclockwise motion. Operation of motor 23 drives drum 32 wherein web 27 is driven thereby and moves around wheels 24 and 25. As web 27 is driven, magnetic elements 26, affixed thereto, are also driven in the direction indicated by the arrow. Since the bottom electrode has been attracted by magnetic elements 26, movement of these elements drives the bottom electrode through welding tip 35 and nozzle 11 of the welding gun as suggested by electrode 13. The rearward end of the second from the bottom electrode 16 falls into engagement with shelf 28 when electrode 13 has been sufficiently driven by the driving means. In addition, electrode 13, when driven beyond engagement with shelf 28 tends to drop down on to the driving mechanism wherein more of the magnetic elements 26 render a greater control thereover and exert a greater influence on the driving of the electrode 13.

Electrode 13 is consumed during the welding process and driven out of the electric welding gun. The frontward end of the second from the bottom electrode 16 drops into engagement with the driving mechanism especially magnetic elements 26 is driven thereby. It may be noted, that in some cases, a slight flash or arc weld may occur between the rearward end of electrode 13 and the frontward end of the next adjacent electrode 16 thereby affecting a connection, albeit a rather tenuous one, between the adjacent electrodes whereby a continuous filament electrode is simulated.

Even though the flash weld between the adjacent tips of the electrodes is not affected, the short stub end of electrode 13 does not drop out of the gun when it leaves the control of the magnetic elements 26 in the driving mechanism. That is, the magnets 30 and 31 will effectively provide a magnetic field which will retain the stub within the gun. It should be noted, that it is not required to have both of the magnets 30 and 31. A single magnet 30 may be utilized if sufficient magnetic control can be obtained over the electrode stub. If, sufficient magnetic control cannot be obtained due to excessively long nozzle 11 or a relatively small magnetizable material content of the electrode, the cylindrical magnet 31 may be desirable. In this case, the magnetic retention of the electrode stub can be maintained until a stub length of half-inch or less is reached. Thus, only a very small amount of stub waste is suffered. If the flash weld is reasonably successful, even this wastage is avoided.

Figure 3:
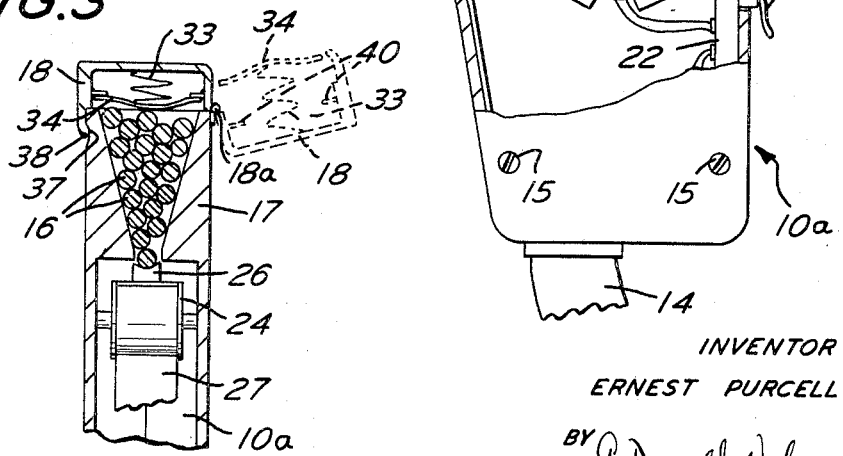
FIGURE 3 is a cross-sectional view of the electric welding gun in FIGURE 2 taken along the lines 3—3 of FIGURE 2.

Referring now to FIGURE 3, there is a cross-sectional view taken along lines 3—3 of the electric welding gun shown in FIGURE 2 and including the cover 18 as suggested in FIGURE 1. Handle 10A encloses the driving mechanism of which idler wheel 24 is shown having the web or belt 27 passed therearound. A magnetic element 26 is shown affixed to belt 27 in any suitable fashion. FIGURE 3 more specifically shows hopper 17, in which electrodes 16 are placed. In the embodiment shown hopper 17 has a substantially V-shaped cross-sectional configuration wherein the bottom of the hopper directs a single electrode into engagement with the driving mechanism, specifically magnetic element 26. In this manner, a plurality of electrodes 16 may be stored in the hopper and, effectively, directed to the driving mechanism individually to avoid any ambiguity in the system by eliminating the possibility of more than one electrode being driven by the driving mechanism simultaneously.

In addition, cover 18 is shown, in solid line, in the position taken when the welding gun is in operation. Thus, cover 18 pivots around hinge 18A such that lip 38 on the unhinged side thereof engages with the detent 37 located at the side of the electric welding gun handle 10A. The lip and detent form a sufficient latch to hold the cover 18 in place when the gun is being used. A suitable resilient member, shown schematically as coil spring 33, is affixed at one end thereof to the inside top of cover 18. At the other end thereof, spring 33 is connected to a plunger 34 or the like. Plunger 34 may, preferably, have a contoured configuration in order to maintain pressure on the electrodes 16 a significant distance into the hopper 17.

As shown in solid line, cover 18 is in place on a gun wherein hopper 17 is completely filled with electrode 16 such that spring 33 is in a compressed configuration and plunger 34 is resting against the uppermost electrodes 16. When cover 18 is in the position shown by dashed line, spring 33 is free to relax from the compressional load thereof so that plunger 34 may extend beyond cover 18. Suitable shelves or shoulders 40 may be included in the internal surface of cover 18 in order to inhibit motion of plunger 34 into cover 18.

Figure 4:
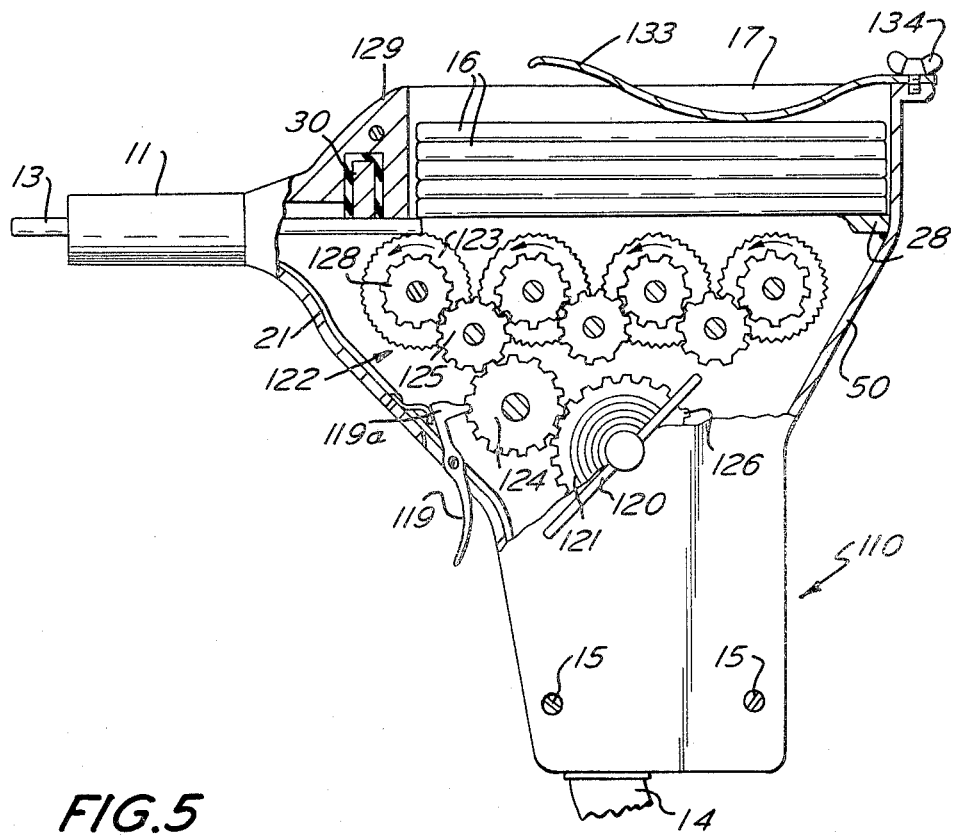
FIGURE 4 is a cross-sectional view of another embodiment of the welding gun using mechanical drive.

Referring now to FIGURE 4, there is shown a mechanical drive system for an electric welding gun similar to that shown in FIGURE 1. The structure of the welding gun shown in FIGURE 4 is substantially similar to the configuration of the welding gun shown in FIGURE 1. Thus, nozzle 11, welding tip 35, magnets 31 and 30 are substantially the same. In addition, cable 14 supplies the electrical curent via conductor strip 21 to welding tip 35. Again, electrodes 16 are stored in hopper 17. The bottom electrode rests on shelf 28 at the rearward end and on the drive mechanism or the electrode being consumed at the forward end. Electrode 13, which is being consumed, is operated upon as in the description of the electric welding gun in FIGURE 1.

A modified spring loaded cover 133 is mounted on gun 110 by means of a wing nut 134 or the like attached at the rear portion 50 of electric welding gun 110. Of course, this modified resilient cover can be utilized with welding gun 10 shown in FIGURE 1.

The mechanical drive gun in FIGURE 4 utilizes a mechanical drive mechanism. The drive mechanism 122 comprises a key 120 which is utilized to wind a typical coil spring 12 or the like. Spring 121 is attached to drive gear 126 through suitable means so that drive wheel 126 is urged in the clockwise direction by the force supplied by spring 121. Trigger switch 119 is pivotally mounted in the handle of mechanical drive electric welding gun 110. A pawl 119A is located in the inner portion of the handle and is, in the normal inoperative condition, urged by a spring or the like into engagement with an intermediate gear 124 to restrain rotation thereof. When trigger switch 119 is operated, as for example by the finger of the operator, pawl 119A is removed from engagement with gear 124 which operates to rotate in a counterclockwise direction under urging by gear 126. Gear 124 meshes with and drives gear 125 in a clockwise direction. Gear 125 meshes with and drives gear 128 in a counterclockwise direction. Gear 128 is affixed to a suitable drive wheel 123. The surface of wheel 123 may be knurled, coated or otherwise treated to provide a roughened surface to provide a tangential, frictional force on the surface of electrodes 16 to drive same through nozzle 11 of electric welding gun 110.

Drive wheels 128 may be fabricated of magnetic material if so desired. While four frictional drive wheels similar to wheel 123 are shown, any number of such drive wheels can be utilized as required to drive the electrodes.

The mechanical drive mechanism 122 shown in FIGURE 4 provides a relatively inexpensive means for driving welding electrodes through the welding gun which forms the instant invention. The tolerance requirements on the gear train of drive mechanism are not critical whereby relatively inexpensive parts may be utilized. In addition, these parts may be readily replaced with standard units thereby rendering repair and modification relatively simple and inexpensive.

Figure 5:
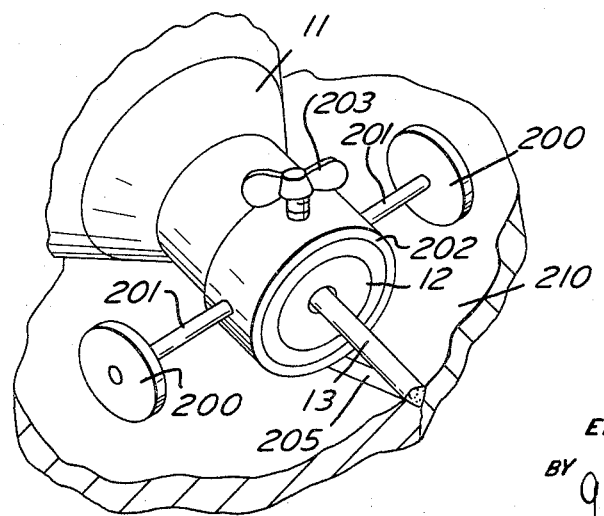
FIGURE 5 is a perspective view of a support and guide member which may be utilized with the electric welding gun.

Referring now to FIGURE 5, there is shown an adjustable support or guide for the electric welding gun. The support comprises a hollow cylinder or ring 202. Shafts 201 are affixed to diametrically opposed points along the periphery of ring 202. Wheels 200 are rotatably mounted at the projecting end of shafts 201. A suitable screw 203 having a wing nut at the end thereof or the like is threadedly engaged with an aperture in ring 202. Thus, screw 203 may be adjusted to provide a secure mounting means for the support on nozzle 11 of an electric welding gun so that welding tip 35 and welding electrode 13 are supported thereby.

Thus, in operation, the support ring 202 of the support member is applied over nozzle 11 of a welding gun and fastened thereto by means of adjustment of screw 203. Wheels 200 are placed upon the work piece 210 so that the gun may ride therealong as the wheels rotate. The gun is activated so that electrode 13 is ejected through the aperture in welding tip 35 and placed in proper position adjacent work piece 210. The arc is struck and electrode 13 is consumed in forming the weld schematically represented by bead 205. As the operator produces the weld, the gun is manually moved by suitable hand pressure and rolls along work surface 10 on wheels 200. This support has the advantage of maintaining relatively constant distance between the gun and the work piece and relieving the fatigue of the operator inasmuch as the full weight of the gun need not be borne thereby. Of course, support ring 200 can be insulated from nozzle 11 by any suitable means including fabricating the support or guide member of an insulating material.

Thus, there has been shown a new electric welding gun which is easier to handle and less expensive to operate than either the known manual or automatic electric welding techniques and guns therefor than has been known in the past. In addition, the initial investment in this gun is less expensive than is required for the known automatic operating electric welding gun and provides more efficient operation than the manual welding gun and technique.

Having thus described the preferred embodiments of the invention, what is claimed is:

1. An electric welding gun comprising, means for storing a plurality of consumable welding electrodes, driving means having an elongated driving path disposed adjacent said means for storing, said driving means including a plurality of driving elements disposed along said driving path to engage a single electrode at a plurality of points along the length thereof, nozzle means through which said driving means passes each of said electrodes to a utilization station at which the electrodes are consumed, and magnetic means disposed adjacent said nozzle means to retain the stub of said electrode in said nozzle after said driving means has driven said electrode.

2. The electric welding gun recited in claim 1 wherein said driving means comprises a variable speed motor, at least one idler wheel, an endless member driven by said motor around said idler wheel, said driving element comprising a plurality of magnetic elements mounted on said endless member and moved thereby, and control means connected to said variable speed motor to effect control thereover.

3. The electric welding gun recited in claim 1 wherein said driving means comprises, a coil spring, means for winding said spring into a compressed condition, means for selectively releasing said coil spring to cause rotation of a drive wheel, and said plurality of driving elements comprising a plurality of roller-like elements which are caused to rotate by rotation of said drive wheel.

4. The electric welding gun recited in claim 1 including ring-like means for engaging said nozzle means, and roller means connected to said ring-like means and adapted to rest upon said utilization station thereby to provide a support for said welding gun.

5. The electric welding gun recited in claim 1 including spacer means for spacing the rearward end of said electrodes away from said driving means until the forward end of said electrode is driven a predetermined distance by said driving means, said forward end of said electrode being engaged by and driven by said driving means only when the rearward end of the preceding electrode has been driven past the forward end of said means for storing electrodes.

6. The electric welding gun recited in claim 1 including means for supplying energy to said electrode adjacent said nozzle means whereby said electrode is consumed during a welding operation.

References Cited

UNITED STATES PATENTS

| | | | |
|---|---|---|---|
| 2,380,450 | 7/1945 | Klopfer | 221—277 X |
| 2,873,843 | 2/1959 | Wilson | 198—41 |
| 3,317,779 | 5/1967 | Henderson | 314—5 |

BERNARD A. GILHEANY, Primary Examiner

R. N. ENVALL, JR., Assistant Examiner

U.S. Cl. X.R.

198—41, 127; 312—72